(No Model.)
J. CLAUSEN.
PLOW.
No. 285,463.   Patented Sept. 25, 1883.
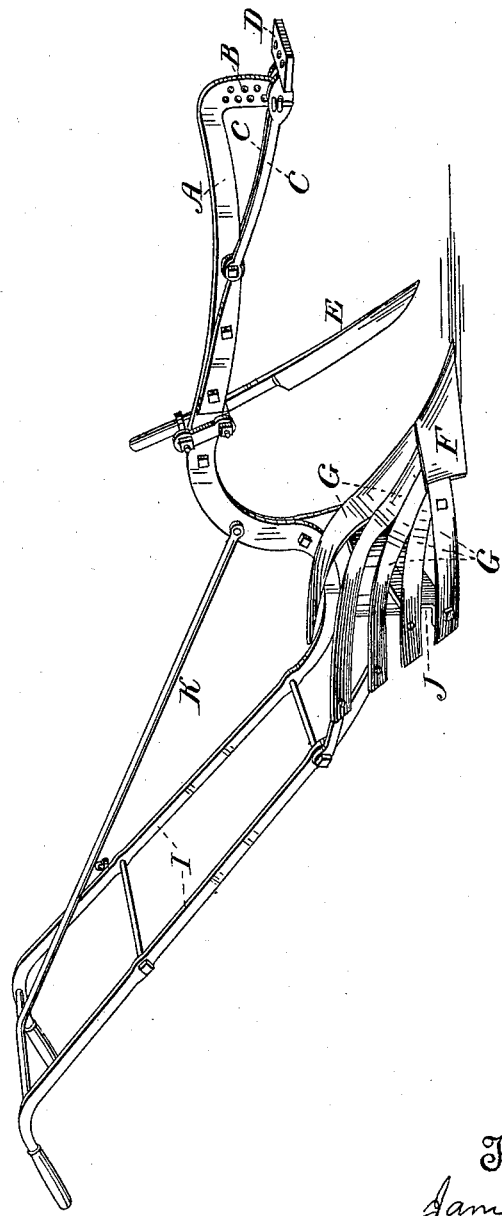
Witnesses,
Geo. H. Strong.
J. H. Nourse
Inventor,
James Clausen
By Dewey & Co.
Attorneys

UNITED STATES PATENT OFFICE.

JAMES CLAUSEN, OF SAN LUIS OBISPO, CALIFORNIA.

PLOW.

SPECIFICATION forming part of Letters Patent No. 285,463, dated September 25, 1883.

Application filed June 22, 1883. (No model.)

*To all whom it may concern:*

Be it known that I, JAMES CLAUSEN, of San Luis Obispo, county of San Luis Obispo, and State of California, have invented an Improvement in Plows; and I hereby declare the following to be a full, clear, and exact description thereof.

My invention relates to certain improvements in plows, and it is especially applicable to plows which are designed to be used in heavy or sticky soil to enable them to scour or clean themselves.

It consists of a high arched beam having a vertically and horizontally adjustable clevis and a mold-board formed of independent strips diverging upward and backward from the share, so as to leave openings between them. Each strip is braced, so as to stiffen it, and the landside is also made very narrow.

Referring to the accompanying drawing, the figure is a view of my plow.

A is the beam of my plow, made, preferably, of iron, and arched high above the front of the plow to prevent its becoming clogged with grass, trash, or soil when it is of a sticky nature. The front end of the beam descends, as shown, and is bent downward at B to provide for the vertical adjustment of the draft. The part B is perforated with holes, through which a pin or bolt may pass.

Arms C are pivoted to the beam at a point some distance back from the front end, and pass each side of the part B, being flattened or enlarged at that point, so that the bolt may pass through them, thus confining these arms at any desired point. At the front end these arms are united to a flat horizontal plate, D, which has holes made in it vertically to receive a bolt, by which the double-trees or draft apparatus is connected with the plow, and by which it may be moved, so as to set the plow to and from the land.

A wheel-colter, or, as shown in the present case, a knife, E, may be fixed to the plow-beam. F is the plowshare. From this the strips G extend upward and backward, being curved outward, so that altogether they form the shape of a mold-board. These strips separate from each other as they extend backward from the share, so that spaces are left between them, as shown.

The landside is shaped similarly to those of ordinary plows, but is made very narrow, usually not exceeding two inches in width.

The handles I are made preferably of iron, the left-hand one being bolted to the rear part of the plow-beam, while the right-hand one extends down behind the upper rear end of the strips G, forming the mold-board and supports, and strengthens them. Brace J may also extend from the lower strips, G, to the standard, so that the whole of this sectional mold-board will be rendered as strong as necessary.

The stay-rod K extends from the plow-beam upward and backward to a point between the handles, near the upper bend, where it forks, and the two ends are secured to the two handle-bars, as shown.

By this construction of a mold-board in narrow independent strips the surface is so reduced that clayey or sticky soils will not ball up and clog upon it, but will be scoured off and the mold-board remain clean, the spaces between the strips G being of such a width that there is not enough surface left for the earth to cling to. The narrow landside will also scour itself clean in the same manner.

Having thus described my invention, what I claim as new, and desire to secure by Letters Patent, is—

1. In a plow, a mold-board composed of narrow independent strips uniting with the plowshare and with each other at the lower end, so as to form a continuous surface, and separating as they curve outward and backward, so as to leave tapering longitudinal spaces between them, in combination with the beam A and handles fixed to the beam, and acting as stays for the mold-board strips, substantially as herein described.

2. In a plow, the high arched beam A, with the vertical perforated extension B, in combination with the pivoted and vertically-adjusting arms C, and the horizontal adjusting-plate D, connected to said arms, substantially as herein described.

3. In a plow, the arched beam A, vertical extension B, adjusting-arms C, and plate D, in combination with the mold-board, composed of independent strips, and the handles fixed to the beam and acting as stays for the mold-board strips, substantially as herein described.

In witness whereof I have hereunto set my hand.

JAMES CLAUSEN.

Witnesses:
ERNEST CERB,
L. M. KAISER.